No. 744,023. PATENTED NOV. 17, 1903.
B. F. BRADBURY.
CREAM SEPARATOR.
APPLICATION FILED APR. 14, 1903.
NO MODEL.
Fig. 1.
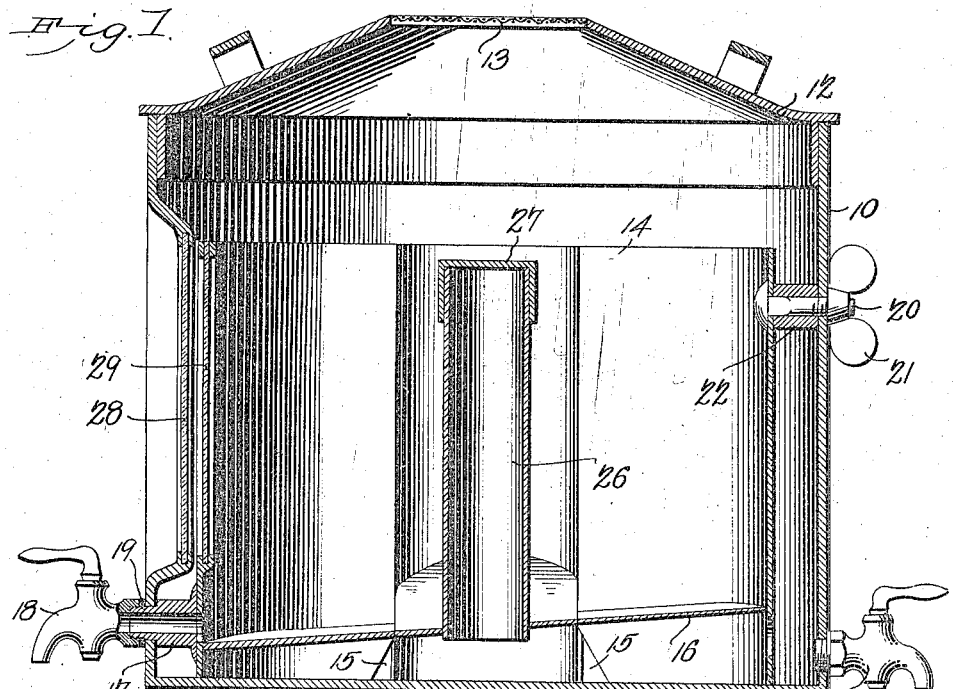
Fig. 3.
Fig. 2.
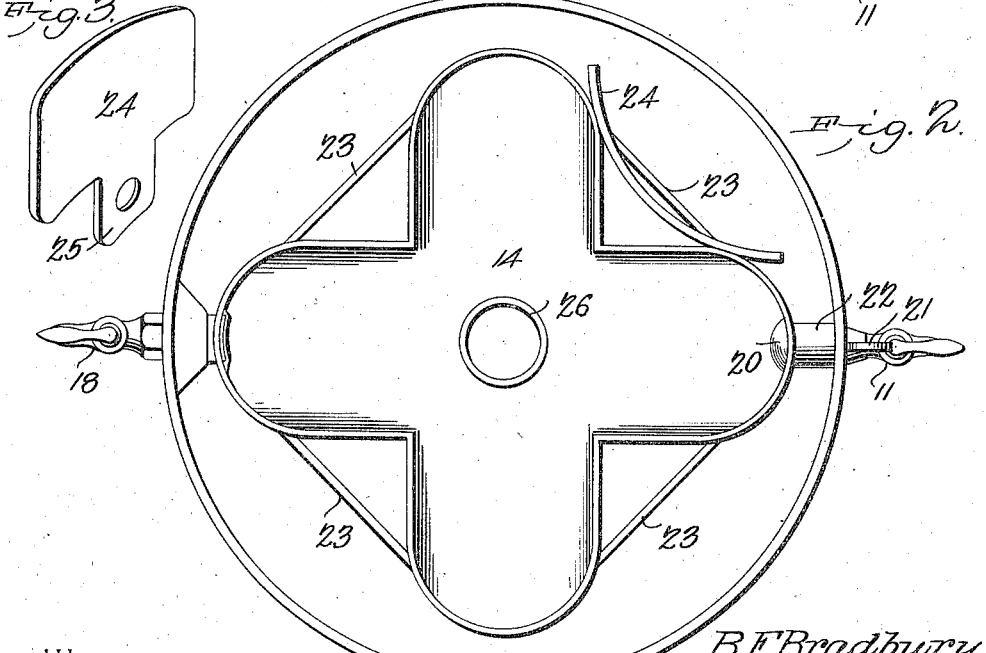
Witnesses
E. F. Stewart
C. N. Woodward
B. F. Bradbury,
Inventor.
by Cashow & Co
Attorneys No. 744,023.

Patented November 17, 1903.

UNITED STATES PATENT OFFICE.

BENJAMIN F. BRADBURY, OF CASTILE, PENNSYLVANIA.

CREAM-SEPARATOR.

SPECIFICATION forming part of Letters Patent No. 744,023, dated November 17, 1903.

Application filed April 14, 1903. Serial No. 152,618. (No model.)

*To all whom it may concern:*

Be it known that I, BENJAMIN F. BRADBURY, a citizen of the United States, residing at Castile in the county of Green and State of Pennsylvania, have invented a new and useful Cream-Separator, of which the following is a specification.

This invention relates in general to apparatuses employed for effecting a separation of the component parts of liquids by subjecting them to the action of a cooling or heating medium externally applied, but is more particularly applicable for the treatment of milk to cause the rapid separation of the cream therefrom, and has for its object to simplify and improve devices of this character and to produce a device which may be readily separated for the purpose of cleansing.

The invention consists in certain novel features of construction, as hereinafter shown and described, and specified in the claim.

In the drawings illustrative of the invention, in which corresponding parts are denoted by like designating characters, Figure 1 is a vertical sectional elevation. Fig. 2 is a plan view with the cover removed. Fig. 3 is a detached perspective view of the water guard or shield.

The improved device may be made of any desired size or capacity, and consists of an outer casing or shell 10, having a discharge-faucet 11 and provided with a cover 12, the latter preferably conical, as shown, and with a central aperture at the apex of the cone covered with screen material 13, so that the cover when inverted may be employed as a "strainer" for the material to be treated and through which it may be fed to the receptacle.

Within the shell 10 is a receptacle 14 for the material to be separated, this receptacle preferably having corrugated side walls to increase its area and spaced from the outer shell and resting on the bottom thereof and provided with one or more notches or other openings 15 to provide free communication between the reservoir and the space beneath the receptacle.

The bottom 16 of the receptacle is spaced from the bottom of the reservoir 10 and inclined to one side, as shown, with a discharge-pipe 17 leading from the lowest point and extending through the adjacent wall of the shell 10.

The outer end of the pipe 17 is threaded and adapted to receive the correspondingly-threaded portion of a faucet 18, provided with a suitable yieldable packing or gasket 19 between the faucet and casing to insure a liquid-tight joint.

The aperture for the pipe 17 through the shell 10 will be somewhat larger than the pipe, so that the receptacle can be readily removed from the reservoir when the faucet 18 and packing 19 are detached, and this ability to readily remove and insert the receptacle is one of the valuable advantages of the invention, as it renders all parts readily and easily accessible for cleansing when required.

At the upper part at the opposite side from the discharge-pipe 17 the receptacle 14 is connected to the outer shell 10, as by a bolt 20, having a wing-nut 21 outside the shell and a spacer 22 between the shell and receptacle, by which means the receptacle can be rigidly supported in position relative to the shell, while at the same time readily detachable when required.

As many of the corrugations may be employed in the vertical walls of the receptacle as required; but generally four will be sufficient, as shown.

The corrugations will be connected by stay-bars 23 to stiffen and strengthen the receptacle, and one of these stays will be utilized to support a splash-guard 24, whose lower end 25 will be caused to engage one of these stays, while the upper end extends above the receptacle and serves to prevent the water or other cooling liquid from splashing over into the inner receptacle. By this simple arrangement milk or other liquids which it is desired to cool by the external application of a cooling medium may be very easily and uniformly treated without exposure to the direct contact of the cooling medium and the cooled liquid drawn off independently of the cooling medium, while the latter may likewise be drawn off independently of the cooled liquid. Then when the parts are to be cleansed they can be very quickly separated for that purpose and then reassembled for use again. This ready separation of the parts and the consequent easy accessibility of all parts to the cleansing process is a very important feature of the invention, especially when the material treated is milk or similar delicate substances, where frequent and thorough cleansing of all utensils and apparatus with which the milk comes in contact is very essential.

When employed for the larger separators or coolers, a central tubular section 26, opening through the bottom 16 of the receptacle, will be employed, into which the cooling liquid rises, and thus supplies a cooling medium centrally of the mass of liquid in the reservoir.

The member 26 will be provided with a detachable cap 27 to prevent the milk flowing into the tube when it is poured into the receptacle.

The outer shell 10 will be provided with a glass-covered observation-aperture 28, and opposite this aperture a corresponding glass-covered gage 29 will be disposed in the receptacle 14, so that the condition and height of the milk and cream may be ascertained at any time.

The device may be of any suitable material and of any desired size and the outer casing and cover exteriorly ornamented in any desired manner.

Having thus described the invention, what I claim is—

A cooling-can comprising an outer casing or reservoir, an inner receptacle formed with corrugated vertical walls and spaced from said outer casing, stay-bars connecting the said corrugations, and a splash-guard having a contracted lower portion adapted to engage one of said stay-bars and extending above said receptacle to protect the contents of the receptacle when water or other cooling liquid is poured into said shell or reservoir, substantially as described.

In testimony that I claim the foregoing as my own I have hereto affixed my signature in the presence of two witnesses.

BENJAMIN F. BRADBURY.

Witnesses:
CHALLEN W. WAYCHOFF,
VERNON R. BRADBURY.